United States Patent
Tiwari

(10) Patent No.: US 8,768,290 B2
(45) Date of Patent: Jul. 1, 2014

(54) APPARATUSES AND METHODS FOR HANDLING OF AN EQUIVALENT PUBLIC LAND MOBILE NETWORK (PLMN) LIST

(75) Inventor: Kundan Tiwari, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 317 days.

(21) Appl. No.: 13/239,459

(22) Filed: Sep. 22, 2011

(65) Prior Publication Data

US 2012/0077456 A1 Mar. 29, 2012

Related U.S. Application Data

(60) Provisional application No. 61/387,551, filed on Sep. 29, 2010.

(51) Int. Cl.
*H04W 4/22* (2009.01)

(52) U.S. Cl.
USPC ............................................. 455/404.1

(58) Field of Classification Search
USPC ............. 455/450, 451, 435.1, 456.1, 435.2, 455/404.1; 370/389, 310, 328, 329, 338, 370/341
See application file for complete search history.

(56) References Cited

U.S. PATENT DOCUMENTS

| | | | |
|---|---|---|---|
| 2008/0220800 A1* | 9/2008 | Gunaratnam et al. | 455/510 |
| 2009/0264126 A1* | 10/2009 | Khetawat et al. | 455/435.1 |
| 2010/0022242 A1* | 1/2010 | Nizri et al. | 455/435.2 |
| 2010/0167755 A1* | 7/2010 | Kim et al. | 455/456.1 |
| 2011/0038372 A1* | 2/2011 | Wijayanathan et al. | 370/389 |
| 2011/0189971 A1* | 8/2011 | Faccin et al. | 455/404.1 |
| 2012/0077497 A1* | 3/2012 | Shaheen | 455/435.1 |
| 2012/0115478 A1* | 5/2012 | Gunaratnam et al. | 455/435.2 |

FOREIGN PATENT DOCUMENTS

| | | |
|---|---|---|
| CA | 2 694 036 A1 | 8/2010 |
| CN | 101483853 A | 7/2009 |
| EP | 1 850 617 A1 | 10/2007 |

OTHER PUBLICATIONS

3GPP, "Technical Specification Group Core Network and Terminals; Mobile radio interface Layer 3 specification; Core network protocols; Stage 3 (Release 9)", 3GPP TS 24.008 V9.3.0 (Jun. 2010), pp. 1-611.

3GPP, "Technical Specification Group Core Network and Terminals; Non-Access-Stratum (NAS) functions related to Mobile Station (MS) in idle mode (Release 9)", 3GPP TS 23.122 V9.3.0 (Jun. 2010), pp. 1-41.

3GPP, Technical Specification Group Core Network and Teminals; Non-Access-Stratum (NAS) protocol for Evolved Packet System (EPS); Stage 3 (Release 10), 3GPP TS 24.301 V10.0.0 (Sep. 2010), pp. 1-299.

China Mobile, "Incorrect handling, by MS, of registration acceptance messages that include R99 and later IEs", 3GPP TSG-CN1 Meeting #35, Tdoc N1-0401588 revision of N1-041522, Aug. 20, 2004, pp. 1-3.

(Continued)

*Primary Examiner* — Melody Mehrpour
(74) *Attorney, Agent, or Firm* — Birch, Stewart, Kolasch & Birch, LLP

(57) ABSTRACT

A mobile communication device with a wireless module and a controller module is provided. The wireless module performs wireless transmissions and receptions to and from a service network. The controller module obtains a list of Public Land Mobile Networks (PLMNs) equivalent to each other when attached to the service network for emergency bearer services via the wireless module, and not stores the list in response to a power-off of the mobile communication device.

6 Claims, 11 Drawing Sheets

(56) References Cited

OTHER PUBLICATIONS

Ericsson et al., "Handling of equivalent PLMN list when attached for emergency bearer services only", 3GPP TSG-CT WG1 Meeting #67, C1-104078, Oct. 11-15, 2010 pp. 1-6.

HTC, "Handling of equivalent PLMN list when UE is attached for emergency services", 3GPP TSG-CT WG1 Meeting #67, C1-103640, Oct. 11-15, 2010, p. 1-5.

Huawei, "Clarification about the UE handling with the TAI list in the forbidden TA", 3GPP TSG CT WG1 Meeting #58, C1-093879, Apr. 20, 2009, pp. 1-4.

3GPP TS 24.008 V9.4.0 (Sep. 2010); 3rd Generation Partnership Project; Technical Specification Group Core Network and Terminals; Mobile radio interface Layer 3 specification; Core network protocols; Stage 3 (Release 9), pp. 1-611.

* cited by examiner

APPARATUSES AND METHODS FOR HANDLING OF AN EQUIVALENT PUBLIC LAND MOBILE NETWORK (PLMN) LIST

CROSS REFERENCE TO RELATED APPLICATIONS

This Application claims priority of U.S. Provisional Application No. 61/387,551, filed on Sep. 29, 2010, and the entirety of which is incorporated by reference herein.

BACKGROUND OF THE INVENTION

1. Field of the Invention

The invention generally relates to handling of an Equivalent Public Land Mobile Network (PLMN) list, and more particularly, to apparatuses and methods for handling the Equivalent PLMN List obtained with an attachment for emergency bearer services.

2. Description of the Related Art

In a typical mobile communication environment, a user equipment (UE), including a mobile telephone (also known as a cellular or cell phone), a laptop computer with wireless communications capability, or a personal digital assistant (PDA) etc., may communicate voice and/or data signals with one or more service network. The wireless communications between the UE and the service networks may be performed using various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others.

Take the WCDMA or LTE technology in compliance with the 3GPP TS 24.008 specification, v9.3.0 (referred to herein as the TS 24.008 specification) and the 3GPP TS 24.301 specification, v9.3.0 (referred to herein as the TS 24.301 specification), and the 3GPP TS 23.122 specification, v9.3.0 (referred to herein as the TS 23.122 specification) as an example. When a UE performs an attachment procedure or a routing area update procedure, it may receive a list of equivalent Public Land Mobile Networks (PLMNs) (or referred to as an Equivalent PLMN List) in an ATTACH ACCEPT message or a ROUTING AREA UPDATE ACCEPT message. Each entry of the list contains a PLMN code which comprises a Mobile Country Code (MCC) and a Mobile Network Code (MNC) for identifying a specific PLMN, and the UE should treat the PLMNs in the list equivalent to each other for the purposes of PLMN selection procedures, cell selection/reselection procedures, and/or handover procedures. Also, the UE keeps a list of forbidden PLMNs (or referred to as a Forbidden PLMN List) that have rejected the registration requests from the UE, i.e., the UE is forbidden to access the PLMNs in the list for normal services. With the Forbidden PLMN List, the UE may avoid selecting the forbidden PLMNs for the purposes of PLMN selection procedures, cell selection/reselection procedures, and/or handover procedures.

BRIEF SUMMARY OF THE INVENTION

Accordingly, embodiments of the invention provide apparatuses and methods for handling of an Equivalent Public Land Mobile Network (PLMN) list. In one aspect of the invention, a mobile communication device comprising a wireless module and a controller module is provided. The wireless module performs wireless transmissions and receptions to and from a service network. The controller module obtains a list of PLMNs equivalent to each other when attached to the service network for emergency bearer services via the wireless module, and does not save the list in response to a power-off of the mobile communication device.

Correspondingly, a method for handling of an Equivalent PLMN list by a mobile communication device is provided. The method comprises the steps of obtaining a list of PLMNs equivalent to each other when attached to a service network for emergency bearer services, and not saving the list in response to a power-off of the mobile communication device.

Other aspects and features of the present invention will become apparent to those with ordinarily skill in the art upon review of the following descriptions of specific embodiments of apparatuses and methods for handling of an Equivalent PLMN list.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

For the case where a UE does not have a Packet Data Network (PDN) connection for emergency bearer services when receiving the Equivalent PLMN List, the UE removes any PLMN that is present in the Forbidden PLMN List from the Equivalent PLMN List before storing the Equivalent PLMN List, so that the UE, after restarted, does not select forbidden PLMNs for PLMN selection procedures. However, there is a situation where a UE has a PDN connection for emergency bearer services when receiving the Equivalent PLMN List, and according to the TS 24.008, 24.301, 23.122 specifications, the UE does not remove the PLMN that is present in the Forbidden PLMN List from the Equivalent PLMN List before storing the Equivalent PLMN List. As a result, the UE, after restarted, may select the PLMNs that are forbidden from the Equivalent PLMN List for PLMN selection procedures, and additional time may be consumed before the UE may obtain normal services since the UE will eventually be rejected by the forbidden PLMNs.

Figure 1:
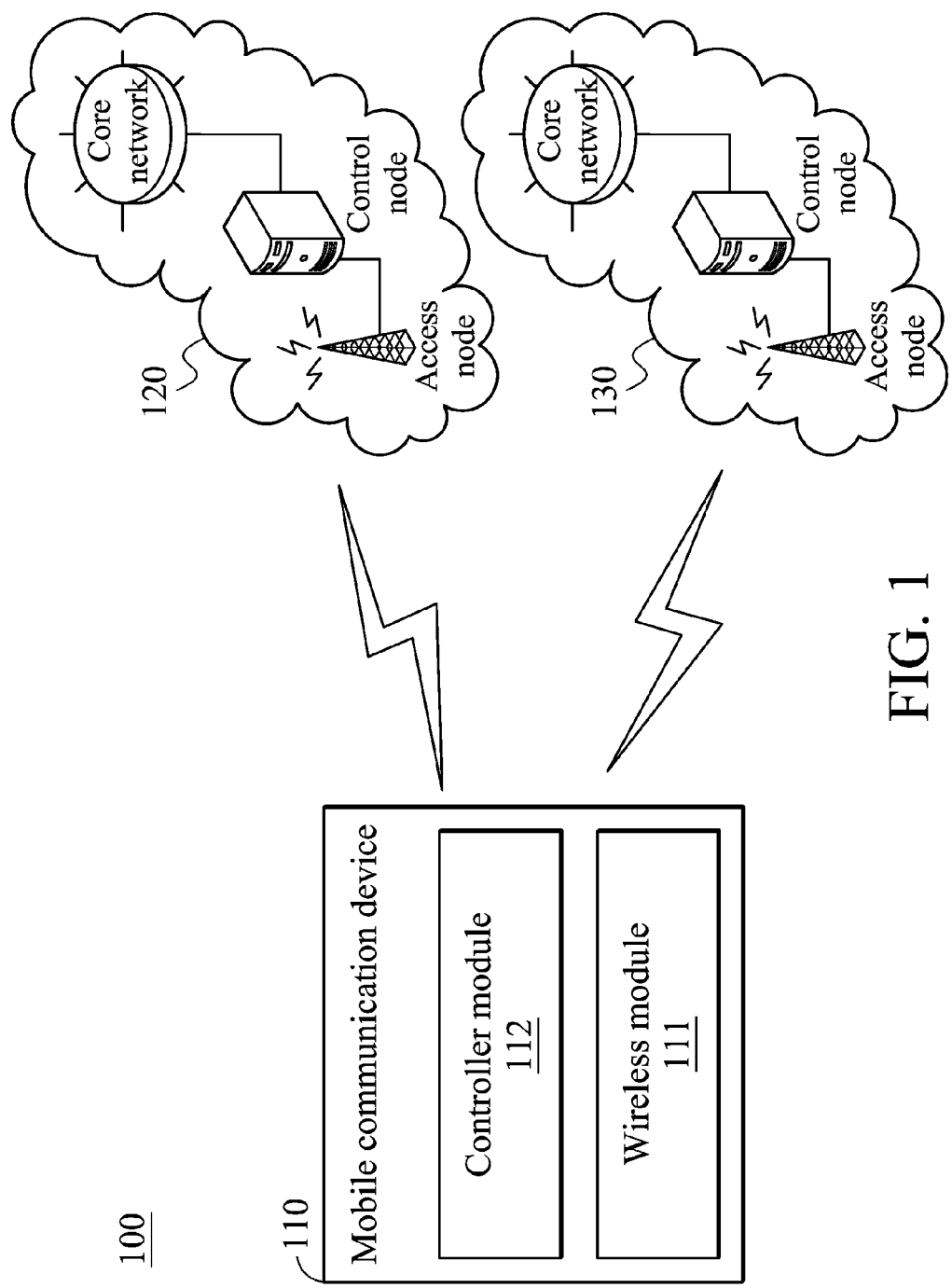
FIG. 1 is a block diagram illustrating a mobile communication environment according to an embodiment of the invention.

In order to solve this problem, the invention proposes ways to handle the Equivalent PLMN List appropriately, so that the UE may avoid selecting the forbidden PLMNs for PLMN selection procedures. FIG. 1 is a block diagram illustrating a mobile communication environment according to an embodiment of the invention. In the mobile communication environment 100, the mobile communication device 110 may selectively register with the service network 120 or 130 for obtaining wireless services. Specifically, the service networks 120 and 130 belong to two different PLMNs. In one embodiment, the service networks 120 and 130 may be two LTE systems, while in another embodiment, the service networks 120 and 130 may be two WCDMA systems. Each of the service networks 120 and 130 comprises at least one access node for performing wireless transmissions and receptions to and from the mobile communication device 110, and a control node for controlling the operation of the at least one access node, wherein the control node is further connected to a core network. The mobile communication device 110 comprises a wireless module 111 for performing the functionality of wireless transmissions and receptions to and from the service networks 120 and/or 130. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE or LTE-Advanced systems, or others depending on the Radio Access Technology (RAT) in use. Also, the mobile communication device 110 comprises a controller module 112 for controlling the operation of the wireless module 111 and other functional components, such as a display unit and/or keypad serving as the MMI (man-machine interface), a storage unit storing the program codes of applications or communication protocols, or others.

Figure 2:
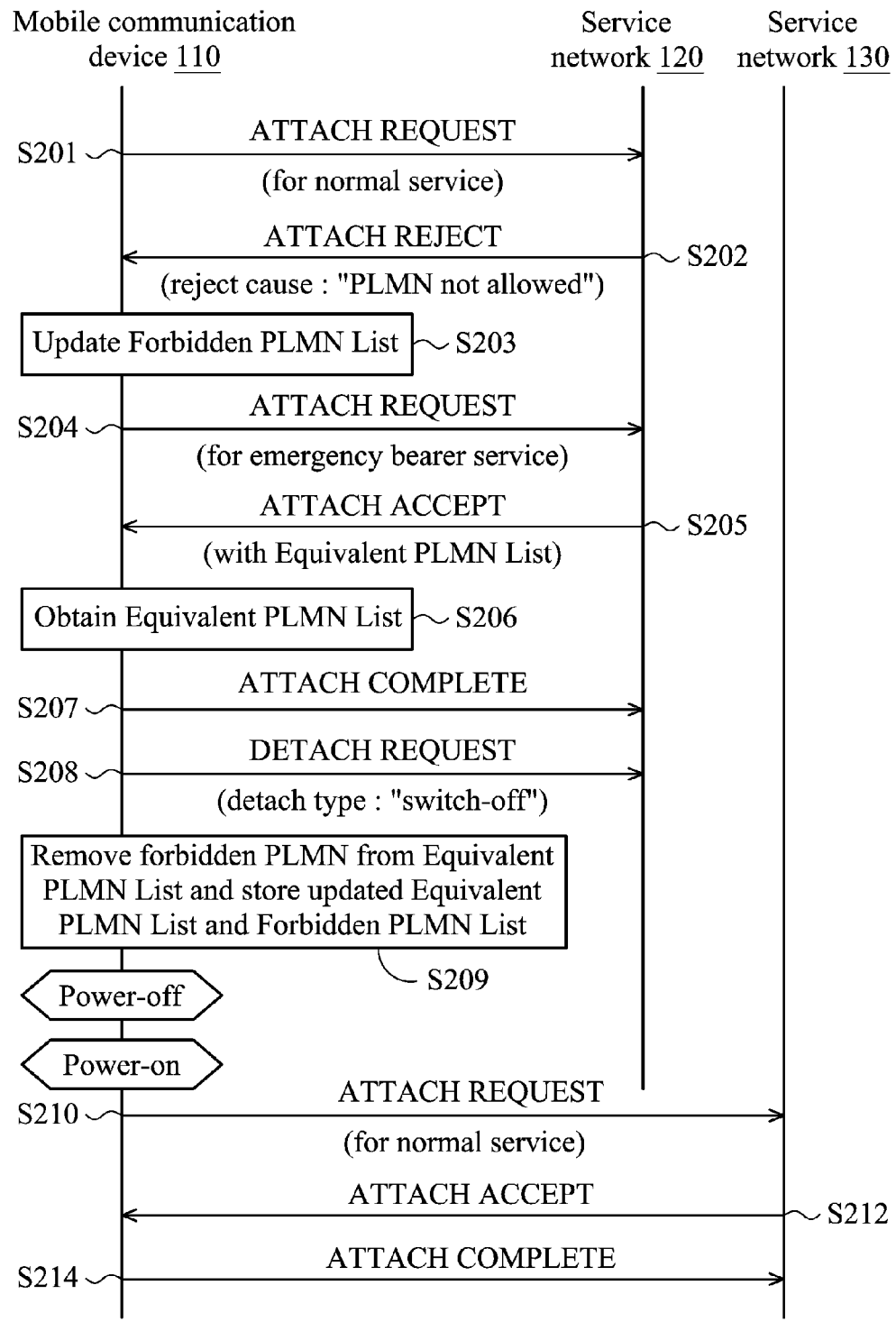
FIG. 2 is a message sequence chart illustrating handling of the Equivalent PLMN List during power-off of the mobile communication device 110 according to an embodiment of the invention.

To be more specific, the controller module 112 controls the wireless module 111 for handling the Equivalent PLMN List during attachment procedures and routing area update procedures. FIG. 2 is a message sequence chart illustrating handling of the Equivalent PLMN List during power-off of the mobile communication device 110 according to an embodiment of the invention. In this embodiment, the mobile communication device 110, after being powered on, is initially at a location where the signal quality of the service network 130 is too bad for registration therewith while the signal quality of the service network 120 is good enough for registration therewith. The mobile communication device 110 first tries to register with the service network 120 for normal services by transmitting an ATTACH REQUEST message (step S201). When receiving the ATTACH REQUEST message, the service network 120 decides to reject the registration request due to the fact that the mobile communication device 110 is not allowed to access the PLMN to which the service network 120 belongs, and then replies to the mobile communication device 110 with an ATTACH REJECT message comprising a rejection cause for indicating "PLMN not allowed" (step S202). In another embodiment, the rejection cause in the ATTACH REJECT message may be "forbidden PLMNs for GPRS service" or "GPRS services not allowed in this PLMN". In response to the ATTACH REJECT message, the mobile communication device 110 adds to the Forbidden PLMN List the PLMN to which the service network 120 belongs (step S203). Later, when the user wishes to initiate an emergency bearer service, e.g., an IP Multimedia Subsystem (IMS) emergency call, the mobile communication device 110 tries to register with the service network 120 for the emergency bearer service by transmitting an ATTACH REQUEST message (step S204). The ATTACH REQUEST message may be transmitted and combined with a PDN CONNECTIVITY REQUEST message to indicate that the UE wishes to start a packet data session with the service network 120. Since the type of services requested by the mobile communication device 110 is an emergency bearer service, the service network 120 accepts the registration request and replies to the mobile communication device 110 with an ATTACH ACCEPT message comprising an Equivalent PLMN List (step S205). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 obtains the Equivalent PLMN List and adds to the Equivalent PLMN List the PLMN to which the service network 120 belongs (step S206), and then transmits an ATTACH COMPLETE message to acknowledge that it has received the ATTACH ACCEPT message (step S207). Specifically, the Equivalent PLMN List comprises at least the PLMN to which the service network 130 belongs. In another embodiment, the Equivalent PLMN List may comprises one or more PLMNs which the mobile communication device 110 should treat with equal priority for the purposes of PLMN selection procedures, cell selection/reselection procedures, and/or handover procedures. Next, when the user decides that the emergency bearer service is no longer required and presses the power-off button (not shown) on the mobile communication device 110, the mobile communication device 110 transmits a DETACH REQUEST message indicating a "switch-off" detach type to the service network 120 to detach from the service network 120 (step S208), and then determines whether the Equivalent PLMN List comprises any one of the PLMNs present in the Forbidden PLMN List. Since the PLMN to which the service network 120 belongs is in the Forbidden PLMN List and the Equivalent PLMN List, the mobile communication device 110 removes the forbidden PLMN, i.e., the PLMN to which the service network 120 belongs, from the Equivalent PLMN List, and stores the Equivalent PLMN List and the Forbidden PLMN List before being powered off (step S209).

Subsequently, when the mobile communication device 110 is powered on, it retrieves the Equivalent PLMN List and selects a PLMN therefrom to register therewith for normal services. Since the PLMN to which the service network 120 belongs is removed from the Equivalent PLMN List and the Equivalent PLMN List comprises the PLMN to which the service network 130 belongs, the mobile communication device 110 tries to register with the service network 130 for normal services by transmitting an ATTACH REQUEST message (step S210). The ATTACH REQUEST message may be transmitted and combined with a PDN CONNECTIVITY REQUEST message to indicate that the UE wishes to start a packet data session with the service network 130. When receiving the ATTACH REQUEST message, the service network 130 decides to accept the registration request for the mobile communication device 110 that is allowed to access the service network 130, and then replies to the mobile communication device 110 with an ATTACH ACCEPT message (step S211). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 transmits an ATTACH COMPLETE message to acknowledge that it has received the ATTACH ACCEPT message (step S212).

Figure 3:
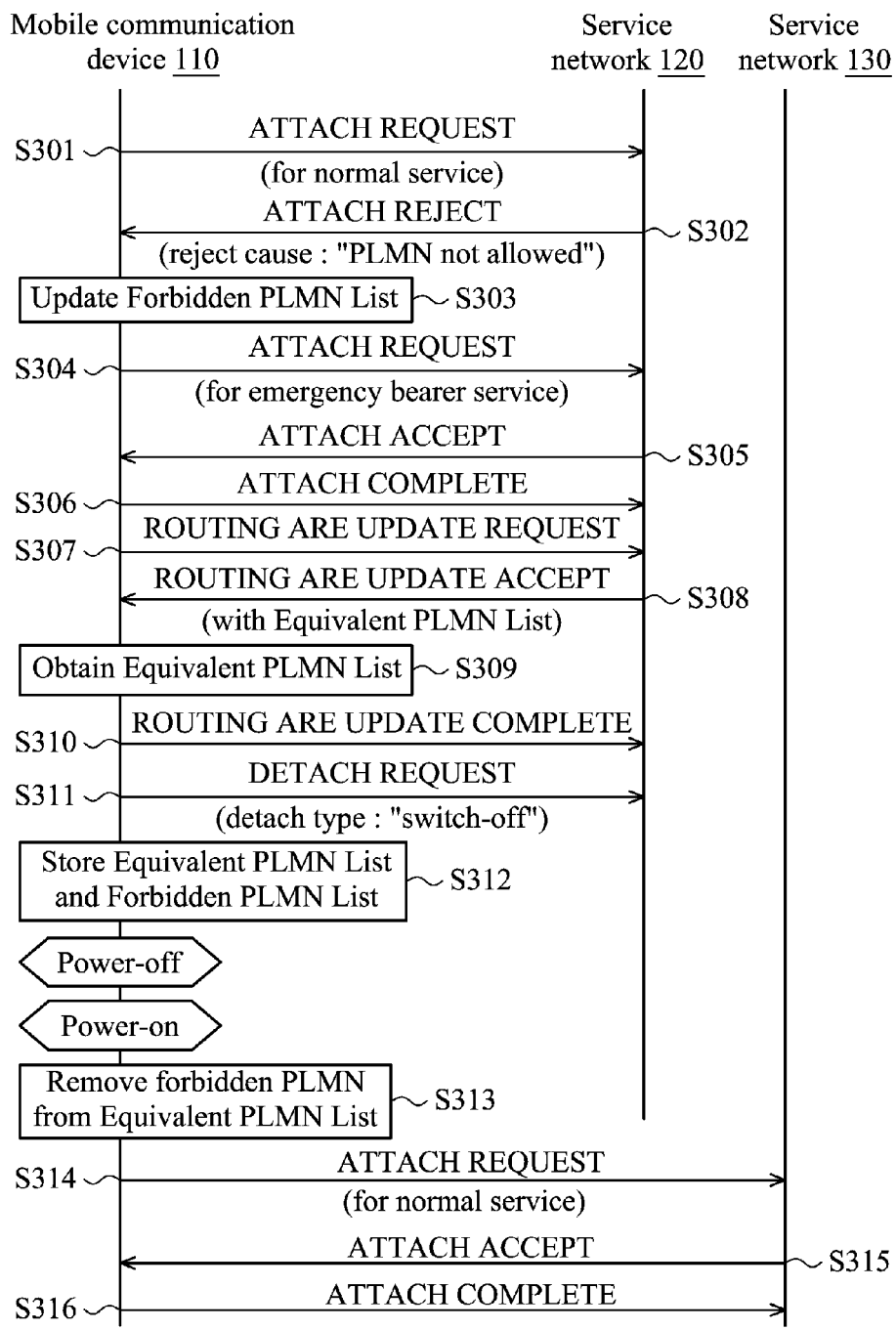
FIG. 3 is a message sequence chart illustrating handling of the Equivalent PLMN List during power-on of the mobile communication device 110 according to an embodiment of the invention.

FIG. 3 is a message sequence chart illustrating handling of the Equivalent PLMN List during power-on of the mobile communication device 110 according to an embodiment of the invention. In this embodiment, the mobile communication device 110, after being powered on, is initially at a location where the signal quality of the service network 130 is too bad for registration therewith while the signal quality of the service network 120 is good enough for registration therewith. The mobile communication device 110 first tries to register with the service network 120 for normal services by transmitting an ATTACH REQUEST message (step S301). When receiving the ATTACH REQUEST message, the service network 120 decides to reject the registration request due to the fact that the mobile communication device 110 is not allowed to access the PLMN to which the service network 120 belongs, and then replies to the mobile communication device 110 with an ATTACH REJECT message comprising a rejection cause for indicating "PLMN not allowed" (step S302). In another embodiment, the rejection cause in the ATTACH REJECT message may be "forbidden PLMNs for GPRS service" or "GPRS services not allowed in this PLMN". In response to the ATTACH REJECT message, the mobile communication device 110 adds to the Forbidden PLMN List the PLMN to which the service network 120 belongs (step S303). Later, when the user wishes to initiate an emergency bearer service, e.g., an IMS emergency call, the mobile communication device 110 tries to register with the service network 120 for the emergency bearer service by transmitting an ATTACH REQUEST message (step S304). The ATTACH REQUEST message may be transmitted and combined with a PDN CONNECTIVITY REQUEST message to indicate that the UE wishes to start a packet data session with the service network 120. Since the type of services requested by the mobile communication device 110 is an emergency bearer service, the service network 120 accepts the registration request and replies to the mobile communication device 110 with an ATTACH ACCEPT message (step S305). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 further transmits an ATTACH COMPLETE message to acknowledge that it has received the ATTACH ACCEPT message (step S306). Subsequently, when the mobile communication device 110 moves from one routing area to another within the PLMN to which the service network 120 belongs, or when a periodic timer for a routing area update procedure expires, the mobile communication device 110 transmits a ROUTING AREA UPDATE REQUEST message to the service network 120 to inform that it has moved to a new routing area (step S307). When receiving the ROUTING AREA UPDATE REQUEST message, the service network 120 replies to the mobile communication device 110 with a ROUTING AREA UPDATE ACCEPT message comprising an Equivalent PLMN List (step S308). In response to the ROUTING AREA UPDATE ACCEPT message, the mobile communication device 110 obtains the Equivalent PLMN List and adds to the Equivalent PLMN List the PLMN to which the service network 120 belongs (step S309), and then transmits a ROUTING AREA UPDATE COMPLETE message to acknowledge that it has received the ROUTING AREA UPDATE ACCEPT message (step S310). Specifically, the Equivalent PLMN List comprises at least the PLMN to which the service network 130 belongs. In another embodiment, the Equivalent PLMN List may comprises one or more PLMNs which the mobile communication device 110 should treat with equal priority for the purposes of PLMN selection procedures, cell selection/reselection procedures, and/or handover procedures.

Next, when the user decides that the emergency bearer service is no longer required and presses the power-off button (not shown) on the mobile communication device 110, the mobile communication device 110 transmits a DETACH REQUEST message indicating a "switch-off" detach type to the service network 120 to detach from the service network 120 (step S311), and then stores the Equivalent PLMN List and the Forbidden PLMN List before being powered off (step S312). After that, when the mobile communication device 110 is powered on again, it retrieves the Equivalent PLMN List and the Forbidden PLMN List, and determines whether the Equivalent PLMN List comprises any one of the PLMNs present in the Forbidden PLMN List. Since the PLMN to which the service network 120 belongs is in the Forbidden PLMN List and the Equivalent PLMN List, the mobile communication device 110 removes the forbidden PLMN, i.e., the PLMN to which the service network 120 belongs, from the Equivalent PLMN List (step S313), and then selects a PLMN therefrom to register therewith for normal services. Since the PLMN to which the service network 120 belongs is removed from the Equivalent PLMN List and the Equivalent PLMN List comprises the PLMN to which the service network 130 belongs, the mobile communication device 110 tries to register with the service network 130 for normal services by transmitting an ATTACH REQUEST message (step S314). The ATTACH REQUEST message may be transmitted and combined with a PDN CONNECTIVITY REQUEST message to indicate that the UE wishes to start a packet data session with the service network 130. When receiving the ATTACH REQUEST message, the service network 130 decides to accept the registration request for that the mobile communication device 110 is allowed to access the service network 130, and then replies to the mobile communication device 110 with an ATTACH ACCEPT message (step S315). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 transmits an ATTACH COMPLETE message to acknowledge that it has received the ATTACH ACCEPT message (step S316).

Figure 4:
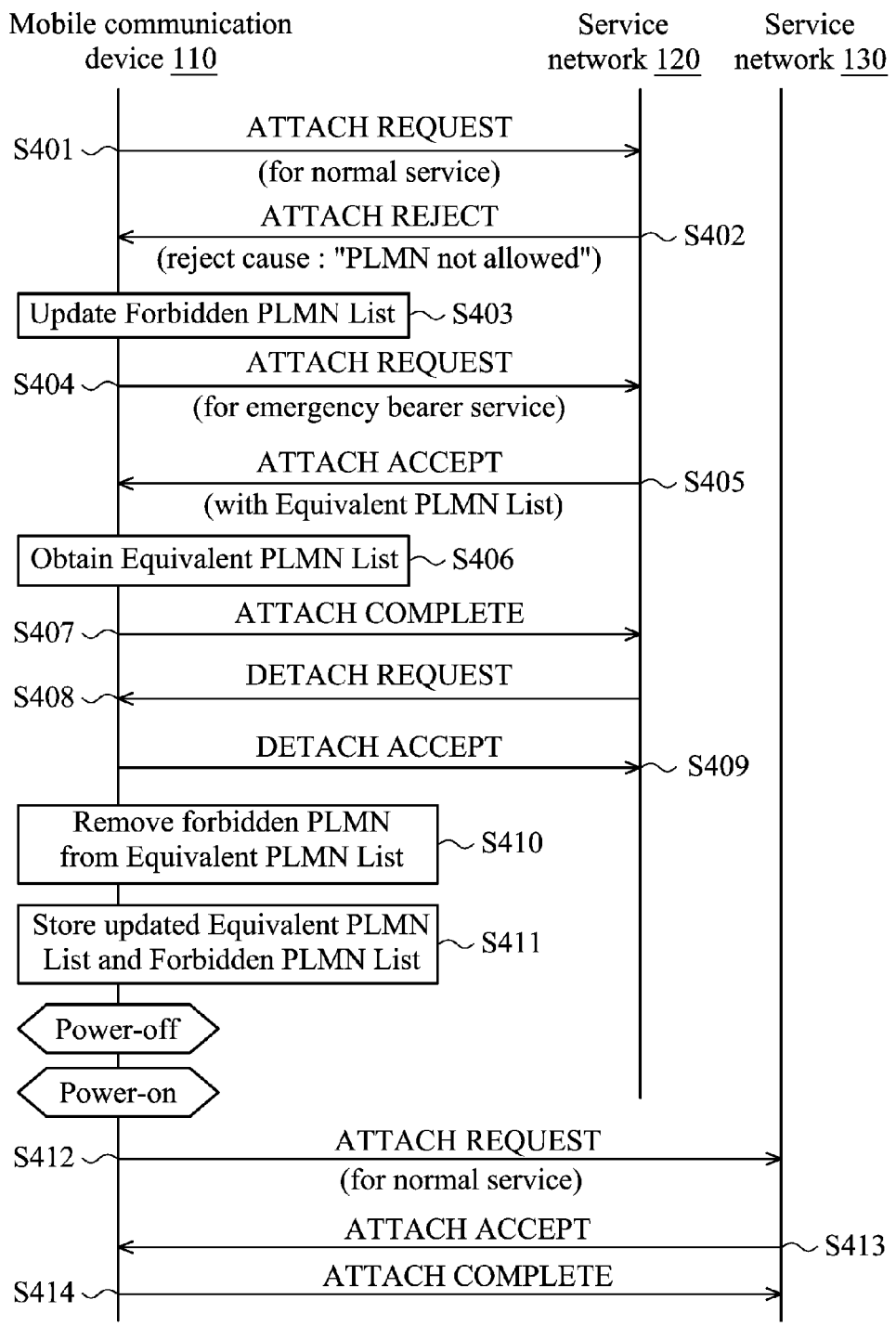
FIG. 4 is a message sequence chart illustrating handling of the Equivalent PLMN List when a PDN connection for an emergency bearer service is released according to an embodiment of the invention.

FIG. 4 is a message sequence chart illustrating handling of the Equivalent PLMN List when a PDN connection for an emergency bearer service is released according to an embodiment of the invention. In this embodiment, the mobile communication device 110, after being powered on, is initially at a location where the signal quality of the service network 130 is too bad for registration therewith while the signal quality of the service network 120 is good enough for registration therewith. The mobile communication device 110 first tries to register with the service network 120 for normal services by transmitting an ATTACH REQUEST message (step S401). When receiving the ATTACH REQUEST message, the service network 120 decides to reject the registration request due to the fact that the mobile communication device 110 is not allowed to access the PLMN to which the service network 120 belongs, and then replies to the mobile communication device 110 with an ATTACH REJECT message comprising a rejection cause for indicating "PLMN not allowed" (step S402). In another embodiment, the rejection cause in the ATTACH REJECT message may be "forbidden PLMNs for GPRS service" or "GPRS services not allowed in this PLMN". In response to the ATTACH REJECT message, the mobile communication device 110 adds to the Forbidden PLMN List the PLMN to which the service network 120 belongs (step S403). Later, when the user wishes to initiate an emergency bearer service, e.g., an IMS emergency call, the mobile communication device 110 tries to register with the service network 120 for the emergency bearer service by transmitting an ATTACH REQUEST message (step S404). The ATTACH REQUEST message may be transmitted and combined with a PDN CONNECTIVITY REQUEST message to indicate that the UE wishes to start a packet data session with the service network 120. Since the type of services requested by the mobile communication device 110 is an emergency bearer service, the service network 120 accepts the registration request and replies to the mobile communication device 110 with an ATTACH ACCEPT message comprising an Equivalent PLMN List (step S405). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 obtains the Equivalent PLMN List and adds to the Equivalent PLMN List the PLMN to which the service network 120 belongs (step S406), and then transmits an ATTACH COMPLETE message to acknowledge that it has received the ATTACH ACCEPT message (step S407). Specifically, the Equivalent PLMN List comprises at least the PLMN to which the service network 130 belongs. In another embodiment, the Equivalent PLMN List may comprises one or more PLMNs which the mobile communication device 110 should treat with equal priority for the purposes of PLMN selection procedures, cell selection/reselection procedures, and/or handover procedures. Next, when the service network 120 decides to end the emergency bearer service, it transmits a DETACH REQUEST message indicating a "re-attach not required" detach type to the mobile communication device 110 (step S408). When receiving the DETACH REQUEST message, the mobile communication device 110 releases the established radio resources of a PDN connection for the emergency bearer service and replies to the service network 120 with a DETACH ACCEPT message (step S409). In response to the release of the PDN connection for the emergency bearer service, the mobile communication device 110 determines whether the Equivalent PLMN List comprises any one of the PLMNs present in the Forbidden PLMN List before storing the Equivalent PLMN List. Specifically, since the PLMN to which the service network 120 belongs is in the Forbidden PLMN List and the Equivalent PLMN List, the mobile communication device 110 removes the forbidden PLMN, i.e., the PLMN to which the service network 120 belongs, from the Equivalent PLMN List (step S410). When the mobile communication device 110 is being powered off, the updated Equivalent PLMN List and the Forbidden PLMN List are stored (step S411).

After the mobile communication device 110 is restarted, it retrieves the Equivalent PLMN List and selects a PLMN therefrom to register therewith for normal services. Since the PLMN to which the service network 120 belongs is removed from the Equivalent PLMN List and the Equivalent PLMN List comprises the PLMN to which the service network 130 belongs, the mobile communication device 110 tries to register with the service network 130 for normal services by transmitting an ATTACH REQUEST message (step S412). The ATTACH REQUEST message may be transmitted and combined with a PDN CONNECTIVITY REQUEST message to indicate that the UE wishes to start a packet data session with the service network 130. When receiving the ATTACH REQUEST message, the service network 130 decides to accept the registration request for that the mobile communication device 110 is allowed to access the service network 130, and then replies to the mobile communication device 110 with an ATTACH ACCEPT message (step S413). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 transmits an ATTACH COMPLETE message to acknowledge that it has received the ATTACH ACCEPT message (step S414).

Figure 5:
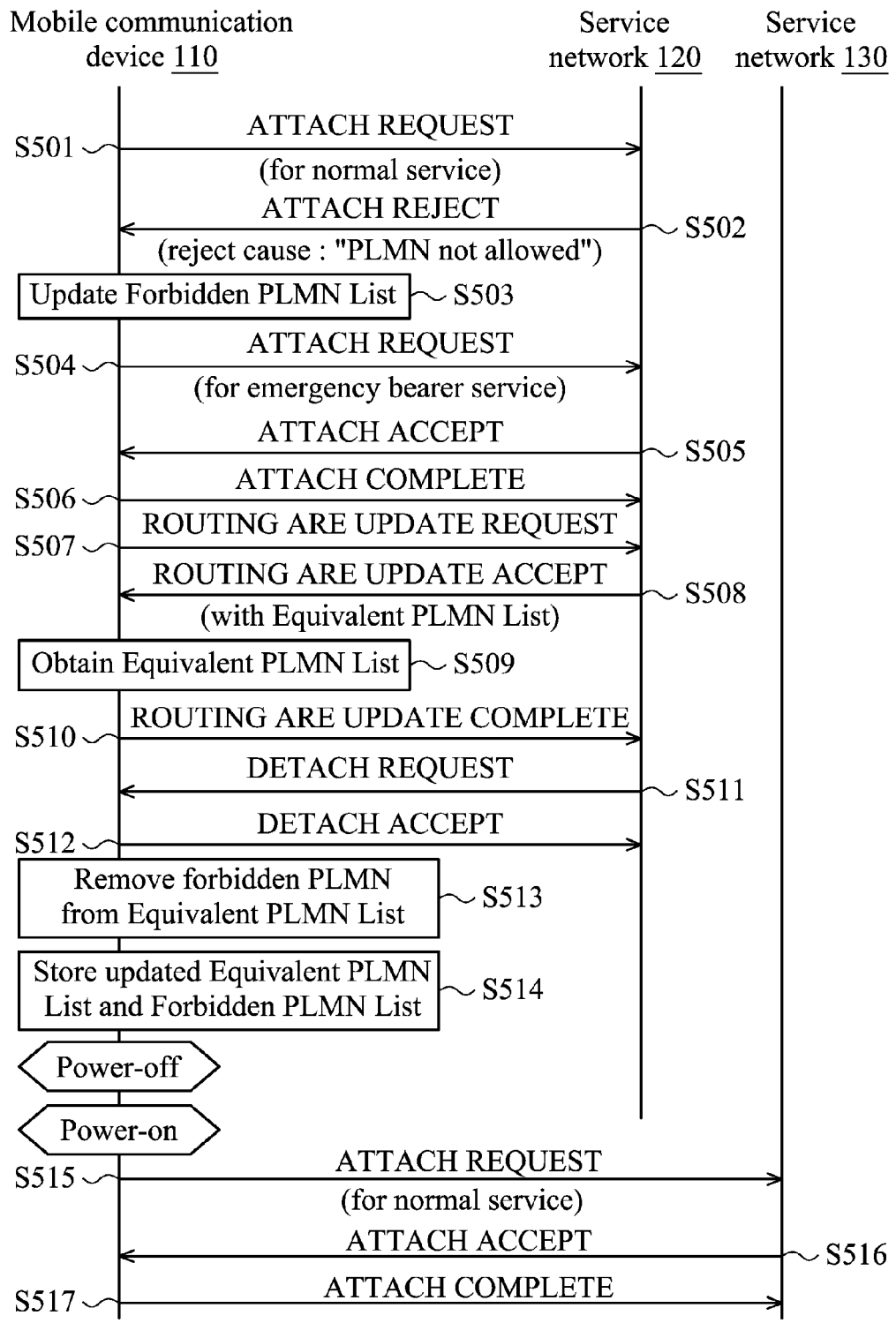
FIG. 5 is a message sequence chart illustrating handling of the Equivalent PLMN List when a PDN connection for an emergency bearer service is released according to another embodiment of the invention.

FIG. 5 is a message sequence chart illustrating handling of the Equivalent PLMN List when a PDN connection for an emergency bearer service is released according to another embodiment of the invention. In this embodiment, the mobile communication device 110, after being powered on, is initially at a location where the signal quality of the service network 130 is too bad for registration therewith while the signal quality of the service network 120 is good enough for registration therewith. The mobile communication device 110 first tries to register with the service network 120 for normal services by transmitting an ATTACH REQUEST message (step S501). When receiving the ATTACH REQUEST message, the service network 120 decides to reject the registration request due to the fact that the mobile communication device 110 is not allowed to access the PLMN to which the service network 120 belongs, and then replies to the mobile communication device 110 with an ATTACH REJECT message comprising a rejection cause for indicating "PLMN not allowed" (step S502). In another embodiment, the rejection cause in the ATTACH REJECT message may be "forbidden PLMNs for GPRS service" or "GPRS services not allowed in this PLMN". In response to the ATTACH REJECT message, the mobile communication device 110 adds to the Forbidden PLMN List the PLMN to which the service network 120 belongs (step S503). Later, when the user wishes to initiate an emergency bearer service, e.g., an IMS emergency call, the mobile communication device 110 tries to register with the service network 120 for the emergency bearer service by transmitting an ATTACH REQUEST message (step S504). The ATTACH REQUEST message may be transmitted and combined with a PDN CONNECTIVITY REQUEST message to indicate that the UE wishes to start a packet data session with the service network 120. Since the type of services requested by the mobile communication device 110 is an emergency bearer service, the service network 120 accepts the registration request and replies to the mobile communication device 110 with an ATTACH ACCEPT message (step S505). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 further transmits an ATTACH COMPLETE message to acknowledge that it has received the ATTACH ACCEPT message (step S506). Subsequently, when the mobile communication device 110 moves from one routing area to another within the PLMN to which the service network 120 belongs, or when a periodic timer for a routing area update procedure expires, the mobile communication device 110 transmits a ROUTING AREA UPDATE REQUEST message to the service network 120 to inform that it has moved to a new routing area (step S507). When receiving the ROUTING AREA UPDATE REQUEST message, the service network 120 replies to the mobile communication device 110 with a ROUTING AREA UPDATE ACCEPT message comprising an Equivalent PLMN List (step S508). In response to the ROUTING AREA UPDATE ACCEPT message, the mobile communication device 110 obtains the Equivalent PLMN List and adds to the Equivalent PLMN List the PLMN to which the service network 120 belongs (step S509), and then transmits a ROUTING AREA UPDATE COMPLETE message to acknowledge that it has received the ROUTING AREA UPDATE ACCEPT message (step S510). Specifically, the Equivalent PLMN List comprises at least the PLMN to which the service network 130 belongs. In another embodiment, the Equivalent PLMN List may comprises one or more PLMNs which the mobile communication device 110 should treat with equal priority for the purposes of PLMN selection procedures, cell selection/reselection procedures, and/or handover procedures.

Next, when the service network 120 decides to end the emergency bearer service, it transmits a DETACH REQUEST message indicating a "re-attach not required" detach type to the mobile communication device 110 (step S511). When receiving the DETACH REQUEST message, the mobile communication device 110 releases the established radio resources of a PDN connection for the emergency bearer service and replies to the service network 120 with a DETACH ACCEPT message (step S512). In response to the release of the PDN connection for the emergency bearer service, the mobile communication device 110 determines whether the Equivalent PLMN List comprises any one of the PLMNs present in the Forbidden PLMN List before storing the Equivalent PLMN List. Specifically, since the PLMN to which the service network 120 belongs is in the Forbidden PLMN List and the Equivalent PLMN List, the mobile communication device 110 removes the forbidden PLMN, i.e., the PLMN to which the service network 120 belongs, from the Equivalent PLMN List (step S513). When the mobile communication device 110 is being powered off, the updated Equivalent PLMN List and the Forbidden PLMN List are stored (step S514).

After the mobile communication device 110 is restarted, it retrieves the Equivalent PLMN List and selects a PLMN therefrom to register therewith for normal services. Since the PLMN to which the service network 120 belongs is removed from the Equivalent PLMN List and the Equivalent PLMN List comprises the PLMN to which the service network 130 belongs, the mobile communication device 110 tries to register with the service network 130 for normal services by transmitting an ATTACH REQUEST message (step S515). The ATTACH REQUEST message may be transmitted and combined with a PDN CONNECTIVITY REQUEST message to indicate that the UE wishes to start a packet data session with the service network 130. When receiving the ATTACH REQUEST message, the service network 130 decides to accept the registration request for that the mobile communication device 110 is allowed to access the service network 130, and then replies to the mobile communication device 110 with an ATTACH ACCEPT message (step S516). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 transmits an ATTACH COMPLETE message to acknowledge that it has received the ATTACH ACCEPT message (step S517).

Alternatively, in step S411 of FIG. 4 and step S514 of FIG. 5, the mobile communication device 110 may not store the Equivalent PLMN List in response to the power-off of the mobile communication device 110. That is, the mobile communication device 110 only stores the Forbidden PLMN List before power-off of the mobile communication device 110. Since the Equivalent PLMN List received during the PDN connection for the emergency bearer service, which may comprise the PLMN(s) present in the Forbidden PLMN List, is not stored before the mobile communication device 110 is powered off, the mobile communication device 110, when restarted later, will use the Equivalent PLMN List previously received during the PDN connection for the normal services, which does not comprise any PLMN present in the Forbidden PLMN List, for subsequent PLMN selection procedures.

Figure 6:
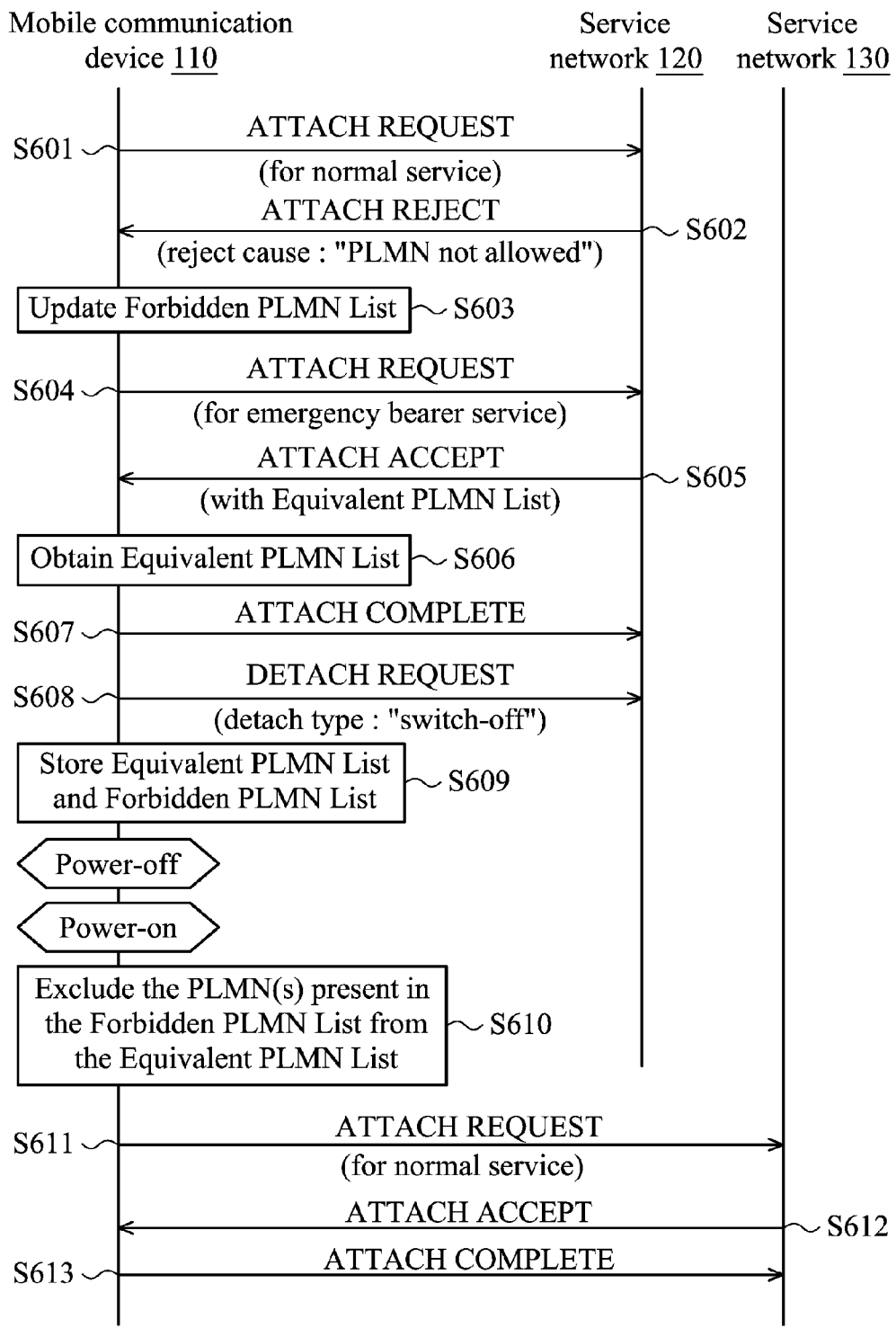
FIG. 6 is a message sequence chart illustrating handling of the Equivalent PLMN List during power-on of the mobile communication device 110 according to another embodiment of the invention.

FIG. 6 is a message sequence chart illustrating handling of the Equivalent PLMN List during power-on of the mobile communication device 110 according to another embodiment of the invention. In this embodiment, the mobile communication device 110, after being powered on, is initially at a location where the signal quality of the service network 130 is too bad for registration therewith while the signal quality of the service network 120 is good enough for registration therewith. The mobile communication device 110 first tries to register with the service network 120 for normal services by transmitting an ATTACH REQUEST message (step S601). When receiving the ATTACH REQUEST message, the service network 120 decides to reject the registration request due to the fact that the mobile communication device 110 is not allowed to access the PLMN to which the service network 120 belongs, and then replies to the mobile communication device 110 with an ATTACH REJECT message comprising a rejection cause for indicating "PLMN not allowed" (step S602). In another embodiment, the rejection cause in the ATTACH REJECT message may be "forbidden PLMNs for GPRS service" or "GPRS services not allowed in this PLMN". In response to the ATTACH REJECT message, the mobile communication device 110 adds to the Forbidden PLMN List the PLMN to which the service network 120 belongs (step S603). Later, when the user wishes to initiate an emergency bearer service, e.g., an IMS emergency call, the mobile communication device 110 tries to register with the service network 120 for the emergency bearer service by transmitting an ATTACH REQUEST message (step S604). The ATTACH REQUEST message may be transmitted and combined with a PDN CONNECTIVITY REQUEST message to indicate that the UE wishes to start a packet data session with the service network 120. Since the type of services requested by the mobile communication device 110 is an emergency bearer service, the service network 120 accepts the registration request and replies to the mobile communication device 110 with an ATTACH ACCEPT message (step S605). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 obtains the Equivalent PLMN List and adds to the Equivalent PLMN List the PLMN to which the service network 120 belongs (step S606), and then transmits an ATTACH COMPLETE message to acknowledge that it has received the ATTACH ACCEPT message (step S607). Specifically, the Equivalent PLMN List comprises at least the PLMN to which the service network 130 belongs. In another embodiment, the Equivalent PLMN List may comprises one or more PLMNs which the mobile communication device 110 should treat with equal priority for the purposes of PLMN selection procedures, cell selection/reselection procedures, and/or handover procedures. Next, when the user decides that the emergency bearer service is no longer required and presses the power-off button (not shown) on the mobile communication device 110, the mobile communication device 110 transmits a DETACH REQUEST message indicating a "switch-off" detach type to the service network 120 to detach from the service network 120 (step S608), and then stores the Equivalent PLMN List and the Forbidden PLMN List before being powered off (step S609).

Subsequently, when the mobile communication device 110 is powered on again, it retrieves the Equivalent PLMN List and the Forbidden PLMN List, and excludes the PLMN(s) present in the Forbidden PLMN List from the Equivalent PLMN List for a PLMN selection procedure (step S610). Specifically, the mobile communication device 110 may determine whether the Equivalent PLMN List comprises any one of the PLMNs present in the Forbidden PLMN List, and then avoid selecting the PLMN(s) that is present in the Forbidden PLMN List. Since the Equivalent PLMN List comprises only the PLMN to which the service network 130 belongs other than the PLMN to which the service network 120 belongs, the mobile communication device 110 selects the PLMN to which the service network 130 belongs, to register therewith for normal services by transmitting an ATTACH REQUEST message (step S611). The ATTACH REQUEST message may be transmitted and combined with a PDN CONNECTIVITY REQUEST message to indicate that the UE wishes to start a packet data session with the service network 130. When receiving the ATTACH REQUEST message, the service network 130 decides to accept the registration request for that the mobile communication device 110 is allowed to access the service network 130, and then replies to the mobile communication device 110 with an ATTACH ACCEPT message (step S612). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 transmits an ATTACH COMPLETE message to acknowledge that it has received the ATTACH ACCEPT message (step S613).

Figure 7:
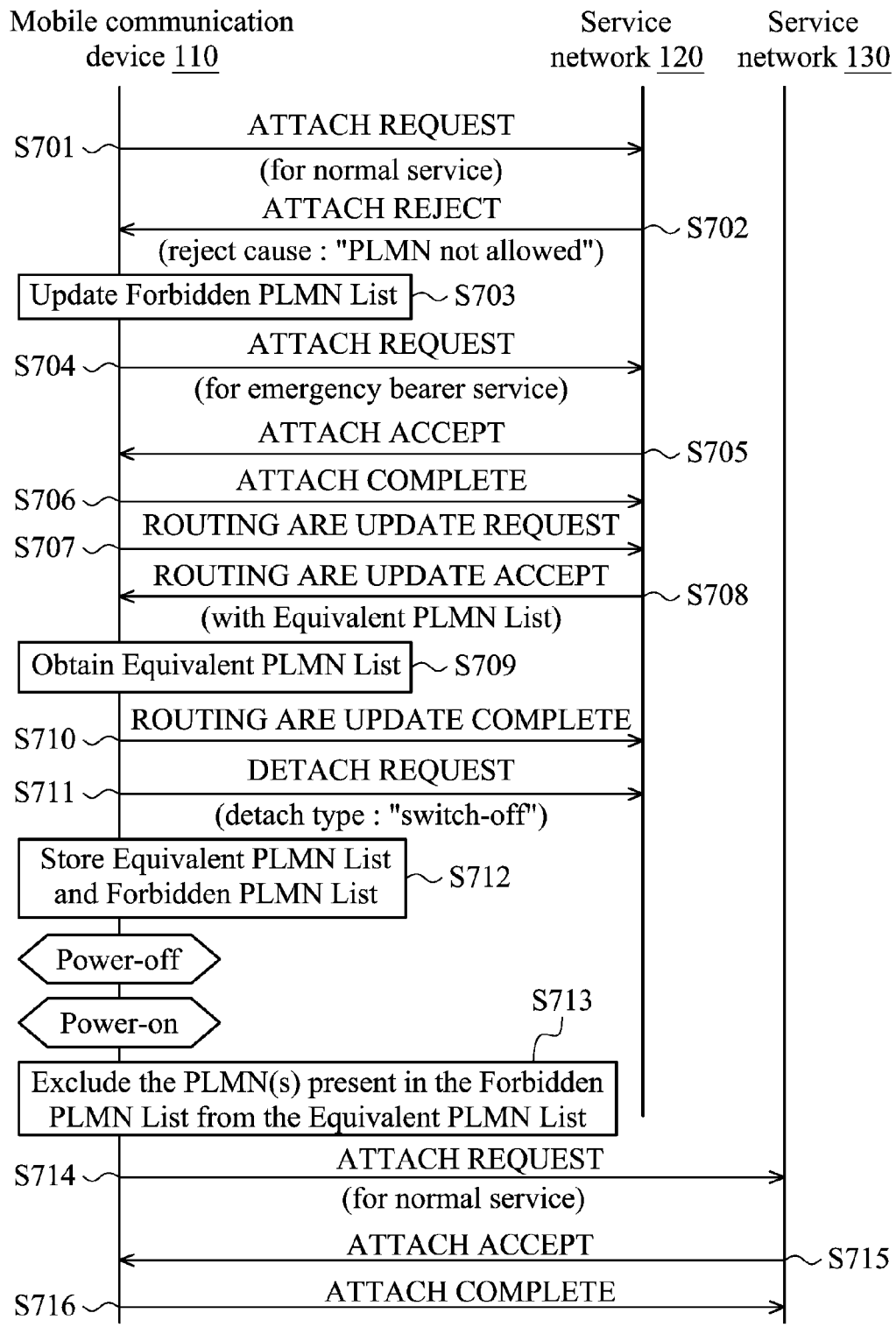
FIG. 7 is a message sequence chart illustrating handling of the Equivalent PLMN List during power-on of the mobile communication device 110 according to yet another embodiment of the invention.

FIG. 7 is a message sequence chart illustrating handling of the Equivalent PLMN List during power-on of the mobile communication device 110 according to yet another embodiment of the invention. In this embodiment, the mobile communication device 110, after being powered on, is initially at a location where the signal quality of the service network 130 is too bad for registration therewith while the signal quality of the service network 120 is good enough for registration therewith. The mobile communication device 110 first tries to register with the service network 120 for normal services by transmitting an ATTACH REQUEST message (step S701). When receiving the ATTACH REQUEST message, the service network 120 decides to reject the registration request due to the fact that the mobile communication device 110 is not allowed to access the PLMN to which the service network 120 belongs, and then replies to the mobile communication device 110 with an ATTACH REJECT message comprising a rejection cause for indicating "PLMN not allowed" (step S702). In another embodiment, the rejection cause in the ATTACH REJECT message may be "forbidden PLMNs for GPRS service" or "GPRS services not allowed in this PLMN". In response to the ATTACH REJECT message, the mobile communication device 110 adds to the Forbidden PLMN List the PLMN to which the service network 120 belongs (step S703). Later, when the user wishes to initiate an emergency bearer service, e.g., an IMS emergency call, the mobile communication device 110 tries to register with the service network 120 for the emergency bearer service by transmitting an ATTACH REQUEST message (step S704). The ATTACH REQUEST message may be transmitted and combined with a PDN CONNECTIVITY REQUEST message to indicate that the UE wishes to start a packet data session with the service network 120. Since the type of services requested by the mobile communication device 110 is an emergency bearer service, the service network 120 accepts the registration request and replies to the mobile communication device 110 with an ATTACH ACCEPT message (step S705). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 further transmits an ATTACH COMPLETE message to acknowledge that it has received the ATTACH ACCEPT message (step S706). Subsequently, when the mobile communication device 110 moves from one routing area to another within the PLMN to which the service network 120 belongs, or when a periodic timer for a routing area update procedure expires, the mobile communication device 110 transmits a ROUTING AREA UPDATE REQUEST message to the service network 120 to inform it that it has moved to a new routing area (step S707). When receiving the ROUTING AREA UPDATE REQUEST message, the service network 120 replies to the mobile communication device 110 with a ROUTING AREA UPDATE ACCEPT message comprising of an Equivalent PLMN List (step S708). In response to the ROUTING AREA UPDATE ACCEPT message, the mobile communication device 110 obtains the Equivalent PLMN List and adds to the Equivalent PLMN List the PLMN to which the service network 120 belongs (step S709), and then transmits a ROUTING AREA UPDATE COMPLETE message to acknowledge that it has received the ROUTING AREA UPDATE ACCEPT message (step S710). Specifically, the Equivalent PLMN List comprises at least the PLMN to which the service network 130 belongs. In another embodiment, the Equivalent PLMN List may comprises one or more PLMNs which the mobile communication device 110 should treat with equal priority for the purposes of PLMN selection procedures, cell selection/reselection procedures, and/or handover procedures.

Next, when the user decides that the emergency bearer service is no longer required and presses the power-off button (not shown) on the mobile communication device 110, the mobile communication device 110 transmits a DETACH REQUEST message indicating a "switch-off" detach type to the service network 120 to detach from the service network 120 (step S711), and then stores the Equivalent PLMN List and the Forbidden PLMN List before being powered off (step S712). After that, when the mobile communication device 110 is powered on again, it retrieves the Equivalent PLMN List and the Forbidden PLMN List, and excludes the PLMN(s) present in the Forbidden PLMN List from the Equivalent PLMN List for a PLMN selection procedure (step S713). Specifically, the mobile communication device 110 may determine whether the Equivalent PLMN List comprises any one of the PLMNs present in the Forbidden PLMN List, and then avoid selecting the PLMN(s) that is present in the Forbidden PLMN List. Since the Equivalent PLMN List comprises only the PLMN to which the service network 130 belongs other than the PLMN to which the service network 120 belongs, the mobile communication device 110 selects the PLMN to which the service network 130 belongs, to register therewith for normal services by transmitting an ATTACH REQUEST message (step S714). The ATTACH REQUEST message may be transmitted and combined with a PDN CONNECTIVITY REQUEST message to indicate that the UE wishes to start a packet data session with the service network 130. When receiving the ATTACH REQUEST message, the service network 130 decides to accept the registration request for that the mobile communication device 110 is allowed to access the service network 130, and then replies to the mobile communication device 110 with an ATTACH ACCEPT message (step S715). The ATTACH ACCEPT message may be transmitted and combined with an ACTIVATE DEFAULT EPS BEARER CONTEXT REQUEST message if the PDN CONNECTIVITY REQUEST message is found in the ATTACH REQUEST message, and the ACTIVATE DEFAULT EPS BEARER CONTEXT REQUEST message is used to activate the default bearer for the packet data session. In response to the ATTACH ACCEPT message, the mobile communication device 110 transmits an ATTACH COMPLETE message to acknowledge that it has received the ATTACH ACCEPT message (step S716).

Figure 8:
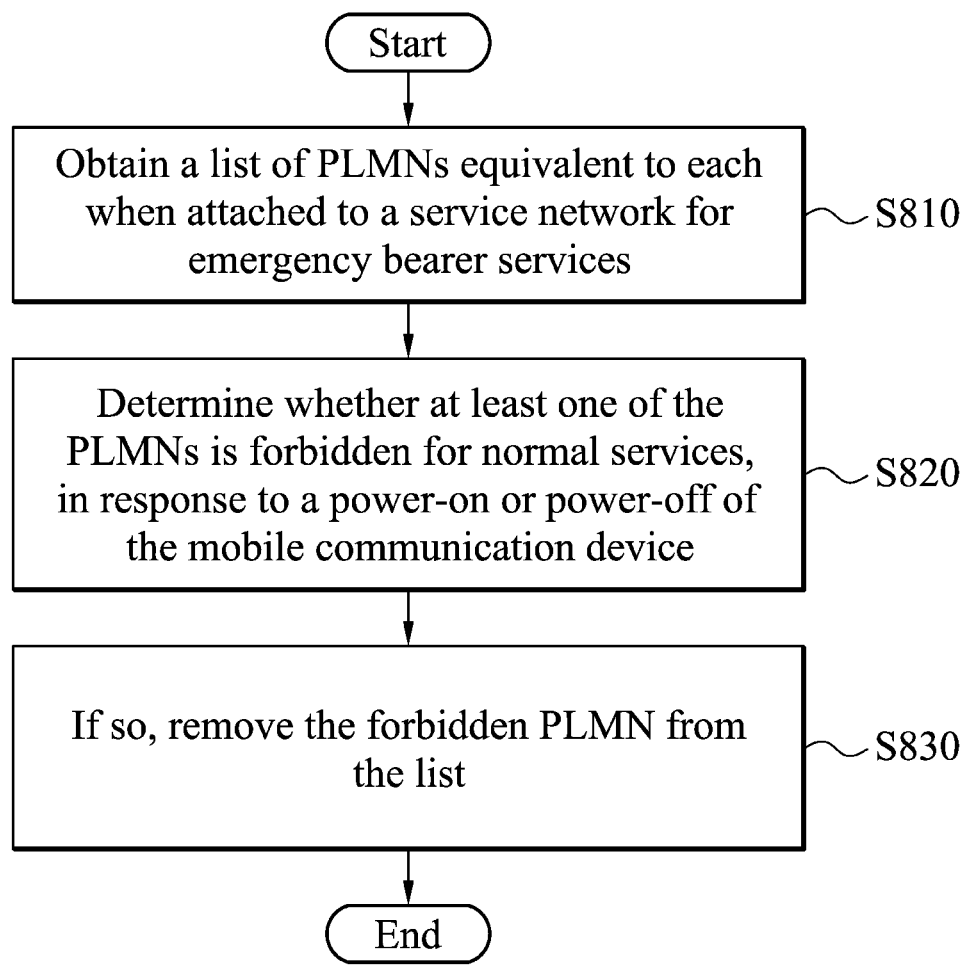
FIG. 8 is a flow chart illustrating the method for handling of an Equivalent PLMN List according to an embodiment of the invention.

FIG. 8 is a flow chart illustrating the method for handling of an Equivalent PLMN List according to an embodiment of the invention. In this embodiment, the method for handling of an Equivalent PLMN List may be applied in any mobile communication device supporting any combination of the WCDMA technology, the LTE technology, and the LTE-Advanced technology. To begin, the mobile communication device obtains a list of PLMNs equivalent to each, i.e., an Equivalent PLMN List, when attached to a service network for emergency bearer services (step S810). In one embodiment, the Equivalent PLMN List may be obtained from an ATTACH ACCEPT message from the service network during an attachment procedure, while in another embodiment, the Equivalent PLMN List may be obtained from an ROUTING AREA UPDATE ACCEPT message from the service network during a routing area update procedure. Next, in response to a power-on or power-off of the mobile communication device, the mobile communication device determines whether at least one of the PLMNs is forbidden for normal services (step S820), and if so, removes the forbidden PLMN from the list (step S830). In one embodiment, before being powered off, the mobile communication device may first detach from the service network, while in another embodiment, the mobile communication device may detach from the service network in response to being powered off. Specifically, the mobile communication device may detach from the service network before step S820 or after step S830. Since the forbidden PLMN is removed from the Equivalent PLMN List, the mobile communication device may store the updated Equivalent PLMN List before being powered off. Thus, after the mobile communication device is restarted, it may avoid selecting a forbidden PLMN from the Equivalent PLMN List for subsequent PLMN selection procedures, cell selection/reselection procedures, and/or handover procedures.

Figure 9:
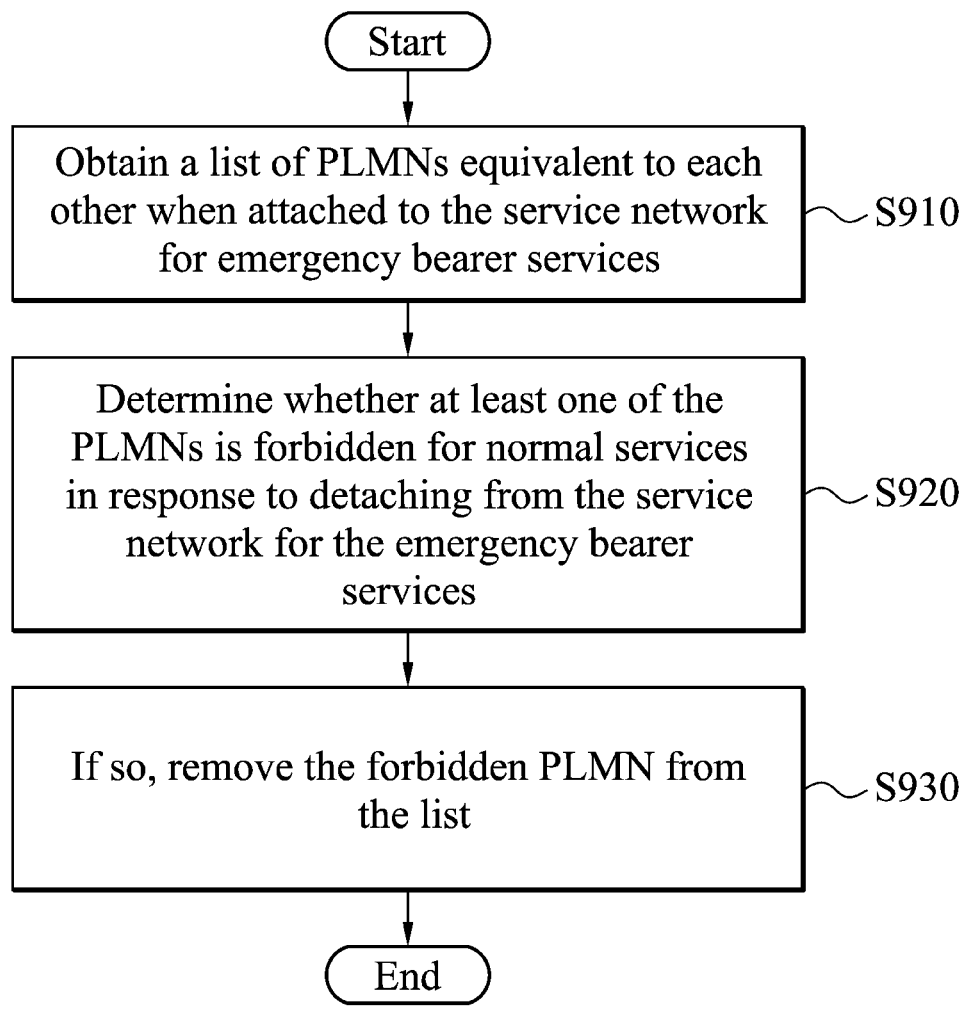
FIG. 9 is a flow chart illustrating the method for handling of an Equivalent PLMN List according to another embodiment of the invention.

FIG. 9 is a flow chart illustrating the method for handling of an Equivalent PLMN List according to another embodiment of the invention. Similar to FIG. 8, the method for handling of an Equivalent PLMN List may be applied in any mobile communication device supporting any combination of the WCDMA technology, the LTE technology, and the LTE-Advanced technology. To begin, the mobile communication device obtains a list of PLMNs equivalent to each, i.e., an Equivalent PLMN List, when attached to a service network for emergency bearer services (step S910). In one embodiment, the Equivalent PLMN List may be obtained from an ATTACH ACCEPT message from the service network during an attachment procedure, while in another embodiment, the Equivalent PLMN List may be obtained from an ROUTING AREA UPDATE ACCEPT message from the service network during a routing area update procedure. Next, in response to detaching from the service network for the emergency bearer services, the mobile communication device determines whether at least one of the PLMNs is forbidden for normal services (step S920), and if so, removes the forbidden PLMN from the list (step S930). Since the forbidden PLMN is removed from the Equivalent PLMN List, the mobile communication device may store the updated Equivalent PLMN List before being powered off. Thus, after the mobile communication device is restarted, it may avoid selecting a forbidden PLMN from the Equivalent PLMN List for subsequent PLMN selection procedures, cell selection/reselection procedures, and/or handover procedures.

Figure 10:
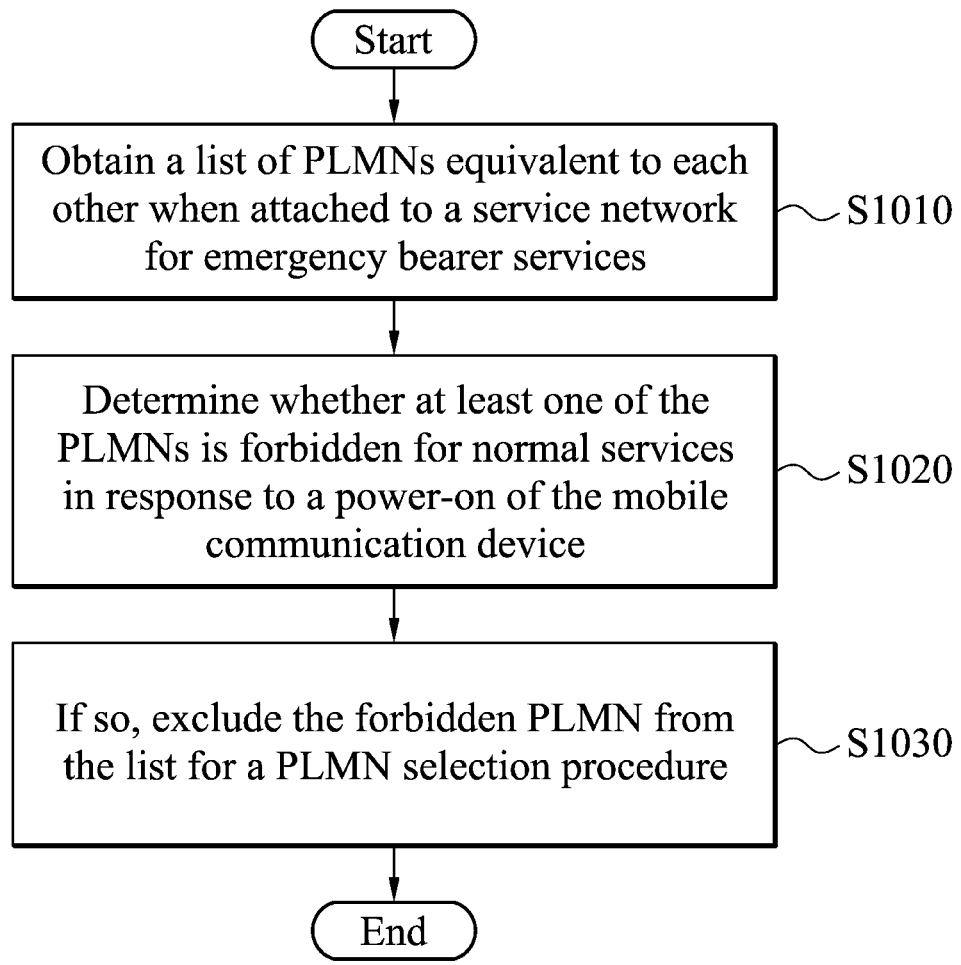
FIG. 10 is a flow chart illustrating the method for handling of an Equivalent PLMN List according to yet another embodiment of the invention.

FIG. 10 is a flow chart illustrating the method for handling of an Equivalent PLMN List according to yet another embodiment of the invention. Similar to FIG. 8, the method for handling of an Equivalent PLMN List may be applied in any mobile communication device supporting any combination of the WCDMA technology, the LTE technology, and the LTE-Advanced technology. To begin, the mobile communication device obtains a list of PLMNs equivalent to each, i.e., an Equivalent PLMN List, when attached to a service network for emergency bearer services (step S1010). In one embodiment, the Equivalent PLMN List may be obtained from an ATTACH ACCEPT message from the service network during an attachment procedure, while in another embodiment, the Equivalent PLMN List may be obtained from an ROUTING AREA UPDATE ACCEPT message from the service network during a routing area update procedure. Next, in response to a power-on of the mobile communication device, the mobile communication device determines whether at least one of the PLMNs is forbidden for normal services (step S1020), and if so, excludes the forbidden PLMN from the list for a PLMN selection procedure (step S1030). In one embodiment, the mobile communication device may also exclude the forbidden PLMN from the list for a cell selection/reselection procedure, and/or a handover procedure. Thus, although the Equivalent PLMN List which may comprise one or more forbidden PLMNs is stored before a power-off of the mobile communication device, the mobile communication device, after it is restarted, will be able to avoid selecting a forbidden PLMN from the Equivalent PLMN List for subsequent PLMN selection procedures, cell selection/reselection procedures, and/or handover procedures.

Figure 11:
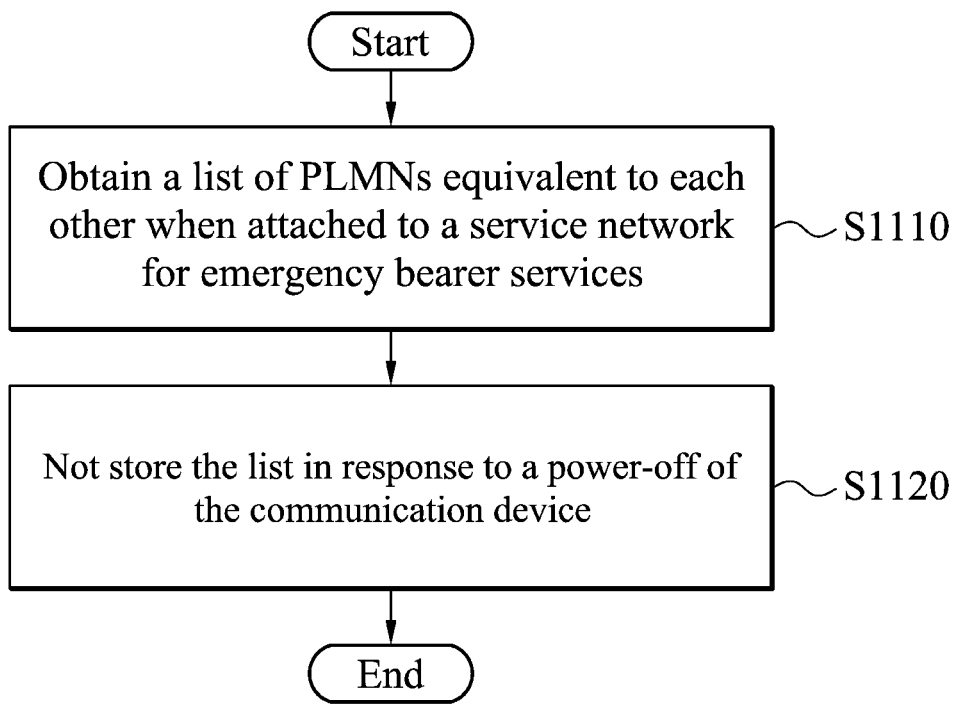
FIG. 11 is a flow chart illustrating the method for handling of an Equivalent PLMN List according to still another embodiment of the invention.

FIG. 11 is a flow chart illustrating the method for handling of an Equivalent PLMN List according to still another embodiment of the invention. Similar to FIG. 8, the method for handling of an Equivalent PLMN List may be applied in any mobile communication device supporting any combination of the WCDMA technology, the LTE technology, and the LTE-Advanced technology. To begin, the mobile communication device obtains a list of PLMNs equivalent to each, i.e., an Equivalent PLMN List, when attached to a service network for emergency bearer services (step S1110). In one embodiment, the Equivalent PLMN List may be obtained from an ATTACH ACCEPT message from the service network during an attachment procedure, while in another embodiment, the Equivalent PLMN List may be obtained from an ROUTING AREA UPDATE ACCEPT message from the service network during a routing area update procedure. Next, in response to a power-off of the mobile communication device, the mobile communication device does not store the list (step S1120). In one embodiment, before being powered off, the mobile communication device may first detach from the service network. Thus, since the Equivalent PLMN List which may comprise one or more forbidden PLMNs is not stored before a power-off of the mobile communication device, the mobile communication device, after it is restarted, will use the Equivalent PLMN List previously received during the PDN connection for the normal services, which does not comprise any forbidden PLMN, for subsequent PLMN selection procedures, cell selection/reselection procedures, and/or handover procedures.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling of an Equivalent PLMN List may be also applied for mobile communication devices in compliance with any evolutionary technology of the WCDMA/LTE/LTE-Advanced technology. Therefore, the scope of the present invention shall be defined and protected by the following claims and their equivalents.

What is claimed is:

1. A mobile communication device, comprising:
    a wireless module performing wireless transmissions and receptions to and from a service network; and
    a controller module obtaining a list of Public Land Mobile Networks (PLMNs) equivalent to each other when attached to the service network for emergency bearer services via the wireless module, and not storing the list in response to a power-off of the mobile communication device.

2. The mobile communication device of claim 1, wherein the controller module further detaches from the service network via the wireless module before or in response to the power-off of the mobile communication device.

3. The mobile communication device of claim 1, wherein the list is obtained from an ATTACH ACCEPT message or a ROUTING AREA UPDATE ACCEPT message from the service network.

4. A method for handling of an Equivalent Public Land Mobile Network (PLMN) list by a mobile communication device, comprising:
    obtaining a list of PLMNs equivalent to each other when attached to a service network for emergency bearer services; and
    not storing the list in response to a power-off of the mobile communication device.

5. The method of claim 4, further comprising detaching from the service network before or in response to the power-off of the mobile communication device.

6. The method of claim 4, wherein the list is obtained from an ATTACH ACCEPT message or a ROUTING AREA UPDATE ACCEPT message from the service network.

* * * * *